Aug. 5, 1969     W. R. MATTHEWS     3,459,259
MUDLINE SUSPENSION SYSTEM
Filed Sept. 9, 1966     7 Sheets-Sheet 1

FIG. 1

INVENTOR
WILLIAM R. MATTHEWS

ATTORNEY

FIG. 2

INVENTOR
WILLIAM R. MATTHEWS
ATTORNEY

FIG. 3

INVENTOR
WILLIAM R. MATTHEWS
Alan B. Paul
ATTORNEY

FIG. 4

INVENTOR
WILLIAM R. MATTHEWS

ATTORNEY

W. R. MATTHEWS 3,459,259

MUDLINE SUSPENSION SYSTEM

Filed Sept. 9, 1966

INVENTOR
WILLIAM R. MATHEWS

Alan G. Paul
ATTORNEY

United States Patent Office 3,459,259
Patented Aug. 5, 1969

3,459,259
MUDLINE SUSPENSION SYSTEM
William R. Matthews, Corpus Christi, Tex., assignor to Mobil Oil Corporation, a corporation of New York
Filed Sept. 9, 1966, Ser. No. 578,248
Int. Cl. E21b 33/035, 43/01, 7/12
U.S. Cl. 166—.5               10 Claims

ABSTRACT OF THE DISCLOSURE

This specification discloses apparatus for tying back a subaqueous well, originally capped on the bottom, to an above-surface deck of a later installed production platform. The capped well was originally drilled using a mudline suspension system wherein the casing strings are hung from, and supported at, the marine bottom. Between the above-surface deck of the production platform and the mudline suspension system is a marine riser and at least casing riser extensions of the outermost casings to permit the monitoring of pressure in the included annuli. Excessive pressure can be bled off from the deck of the platform. The marine riser and the casing riser extensions are supported in the mudline system, the platform only horizontally bracing the marine riser and the various casing riser extensions. The upper ends of the marine riser and the various casing riser extensions extending between the mudline system and the platform deck are not rigidly longitudinally fixed with respect to each other to allow movement as the platform is deformed under wind and wave loads.

---

This invention relates to a method and apparatus for tying back the casing strings of a subaqueous well, drilled from a floating vessel and capped at the mudline, and more particularly, the invention relates to a method and apparatus for completing a well, capped at the mudline, on an above-surface platform later erected at the well site.

Production of gas and/or oil located beneath the continental shelves and the contemplated extension of these efforts to the continental slopes has given rise to various problems not usually existing in connection with onshore completions. Among the many problems encountered is that of providing an above-surface platform for drilling the subaqueous well. The first type of above-surface platform to be utilized for drilling in deep water (over 50 feet) consisted of a fixed template with the well casing strings hung from the deck thereof. With the later development of mobile bottom-supported platforms and free-floating shipshaped and transparent drilling vessels, a different system for supporting the well casing strings was necessary. To enable the above-surface drilling structure to get off the well site in case of violent storms, it became necessary for the well casing strings to be hung in an underwater wellhead supported on the marine bottom with a quickly disconnectable marine riser or conductor pipe extending between the underwater wellhead and the above-surface drilling platform. Assemblies of this type have been generally referred to as "mudline suspension systems." Another advantage of a mudline suspension system is the ease in which a well can be capped and temporarily abandoned if it is not desirable to produce the well at the time it is drilled, due to the ability to disconnect the marine drilling riser, extending between the marine bottom and the above-surface drilling deck. A further advantage of a mudline suspension system is that a later erected production platform can be of the minimal size necessary to support the vertical loads resulting from its own weight and that of a drilling or workover rig thereon. Only lateral support for the marine production riser is required. At this time, mudline suspension systems are becoming one of the conventional methods of completing an offshore well, particularly when the well is drilled from a floating vessel.

When drilling from a floating vessel, utilizing a mudline suspension system, the casing strings are preferably landed in hangers in an underwater wellhead supported in a landing base anchored into and supported by the formations underlying the marine bottom. The casing strings are releasably extended back to the drilling rig at the surface, through subsea blowout preventers installed on the underwater wellhead and the marine drilling riser. After the well has been drilled and tested, the marine drilling riser, the blowout preventers, and the extension casing strings are removed. A cap may be installed over the underwater wellhead at the mudline if it is not desirable to complete the well at that time. At a later date the operator then has the option of completing the well by either installing a subsea Christmas tree at the mudline or installing a production platform with an above-surface deck and extending the casing strings back to this platform with a conventional above-surface Christmas tree mounted thereon. This option allows the operator to drill his well, or all of the wells in an entire field if he desires, but not make a decision about how to complete and produce the well or wells until he feels he has sufficient data to make these decisions.

Several problems though have shown up in the execution of the above-described mudline suspension systems. One is concerned with the inability, in most mudline suspension systems, of being able to ascertain whether there is leakage between the various annuli of the well beneath the underwater wellhead. This is a serious problem which can cause casing string failures and possible loss of the well itself.

Another problem is that the tremendous wind and wave loads on a production platform set in deep water will cause the platform to move relative to the marine bottom no matter how much it is overdesigned. In the past, those utilizing mudline suspension systems have not considered this factor and previously installed production platforms have been designed so that the well is extended back to the surface and the production equipment is installed thereon without any provision for the relative movement or "breathing" of the various casing string extensions. Furthermore, it has not been the practice to provide any means for monitoring and relieving any pressure on the relatively low pressure marine production riser, or conductor pipe, if a high pressure leak should develop and exert internal pressure thereon.

A still further problem found in mudline suspension systems is directly related to the restricted space within the underwater wellhead. With each casing string that must be extended back to the surface, a casing hanger must be set inside or formed as a part of the next larger casing string. This means that by the time the well is drilled and three or more casing strings must be extended coaxially back to the surface, there is very little room available for hanging the innermost casing string or strings in the underwater wellhead.

Therefore, it is an aspect of the present invention to provide a method and apparatus for monitoring the annuli of a subaqueous well, between the various casing strings, to determine whether there are any pressure leaks in any casing string walls beneath the underwater wellhead of a mudline suspension system.

It is another aspect of the present invention to provide apparatus for hanging all of the required casing strings at the mudline in such a way that enough room is available for proper sized hangers for the innermost casing string necessary.

It is a further aspect of the present invention to provide a means for compensating for relative movement between each of the casing string extensions and the production riser, at the upper ends thereof, and the deck of the production platform above the surface of the water.

It is a still further aspect of the present invention to monitor the internal pressure acting on a production riser and to provide means to relieve any excessive pressure prior to taking remedial action.

Other aspects and advantages of the present invention will become apparent from the following description when taken with reference to the accompanying drawings, wherein is shown a preferred embodiment of the invention:

Figure 1:
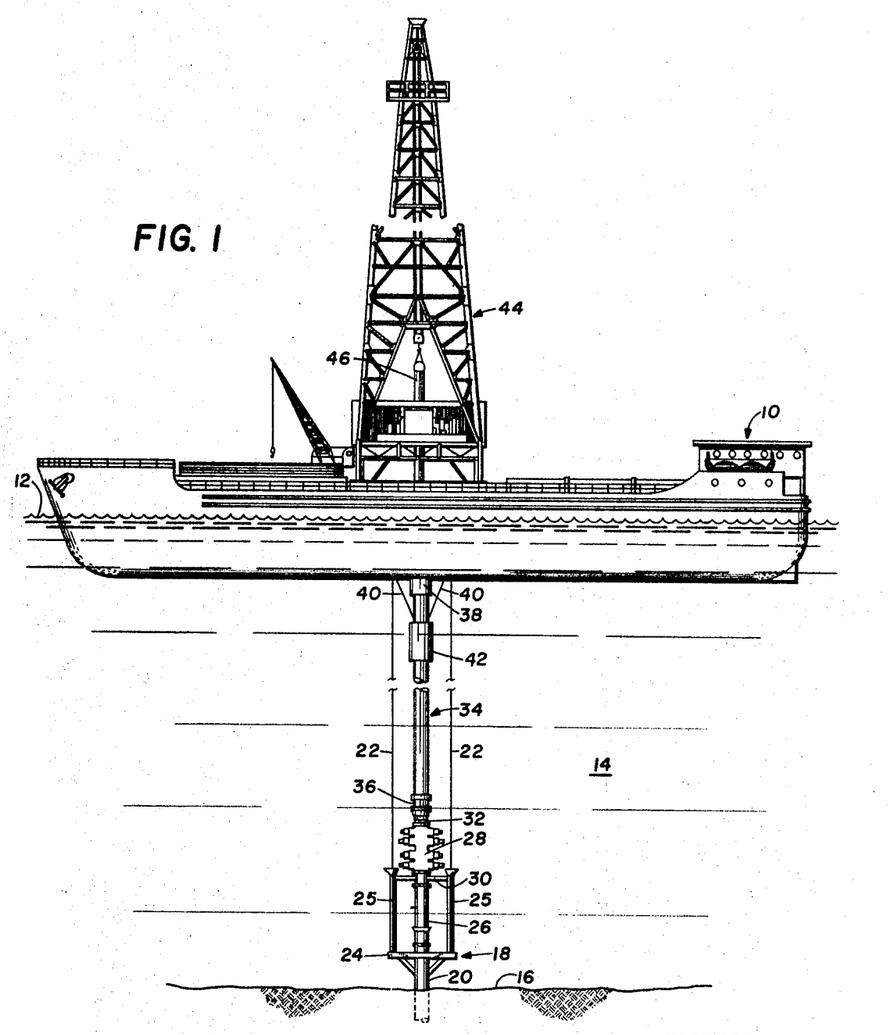
FIGURE 1 is a side elevational view of a floating vessel with a rig mounted thereon for drilling a subaqueous well by utilizing a mudline suspension system.

Now referring to FIGURE 1, there is illustrated a floating drilling vessel of the shipshaped type, generally designated 10, floating on the surface 12 of a body of water 14 for drilling a subaqueous well in formations underlying a marine bottom 16. As shown in this view, a guide structure, generally designated 18, fixedly mounted on the upper end of a conductor pile 20, is supported just above the marine bottom 16 by the underlying formations. The conductor pile 20 with the guide structure 18 attached is jetted into the marine bottom 16 or driven in by a pile driver, though for the purposes of this discussion it is immaterial how the conductor pile 20 and guide structure 18 are assembled, and in fact, the conductor pile can even be drilled into the bottom and the guide structure 18 later assembled thereon. Many alternative schemes for establishing contact with the bottom 16 have been proposed and are, at this time, an integral portion of the prior art.

Guidelines 22 are secured in the guide structure 18 and extend to the drilling vessel 10, where they are held in constant tension by conventional means such as counterweighting or by the use of constant tension motors and winches. The guide structure 18 consists of a landing base 24 fixed to the conductor pile 20 and mounting a plurality of vertical guideposts 25 through which the guidelines 22 extend. The guide structure 18, forming no part of the present invention, is shown as the type generally described in the United States Patent No. 3,186,487, of R. L. Geer et al., issued on June 1, 1965.

An underwater wellhead 26 is operatively connected to the upper end of the conductor pile 20 and in turn releasably mounts a blowout preventer (BOP) stack 28, both of which have been guided down the guidelines 22 from the floating vessel 10. A yoke 30, extending transversely from the lower end of the BOP stack 28, with outer ends thereof adapted to encircle the guidelines 22 and coact with the guideposts 25, registers the BOP stack 28 directly with the upper end of the wellhead 26. A quick release coupling 32 connects the upper end of the BOP stack 28 with a marine drilling riser, generally designated 34. Depending on water depth, the drilling riser 34 may have a universal joint 36, on the lower end thereof, and at least one slip joint 38 near the upper end. A pair of supporting cables 40 connect the marine riser 34, below the slip joint 38, with constant tension devices (not shown) on the floating vessel 10 for supporting the drilling riser 34 in the body of water 14 without subjecting the riser 34 to the motions of the floating vessel 10. A buoyancy tank 42 may be mounted concentrically on the marine riser 34 to reduce the amount of the tensioning force that must be supplied by the cables 40. The subsurface BOP stack 28, the marine drilling riser 34, and the associated tensioning equipment are all conventional.

An offshore drilling rig, generally designated 44, is mounted on the deck of the floating drilling vessel 10 just over a central well or "moonpool" (not shown), as it is commonly called. A pipe string 46 is suspended from the drilling rig 44 and extends down through the marine drilling riser 34, the BOP stack 28, the underwater wellhead 26, the conductor pile 20, and into the subaqueous formations beneath the marine bottom 16 to perform the drilling operations.

Figure 2:
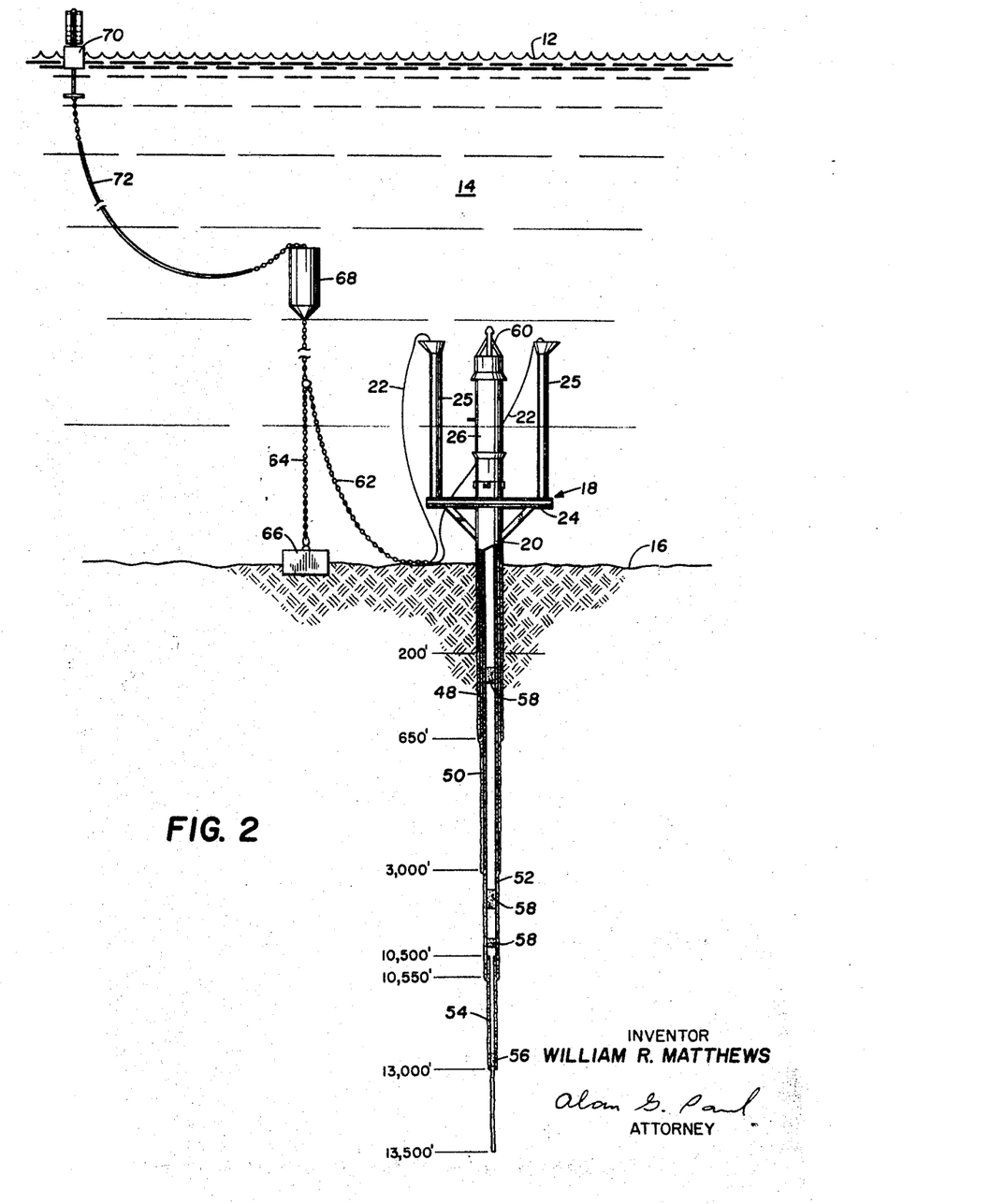
FIGURE 2 is a side elevational view, partially in cross section, of a configuration of an illustrative deep well drilled with the equipment shown in FIGURE 1 and capped on the marine bottom.

FIGURE 2 shows a well that has been drilled in accordance with the techniques referred to with respect to FIGURE 1, the well being capped and marked so that it can be located at a later date. For purposes of making this description as easy to follow as possible, specific sizes and lengths have been designated to the various casing strings and the total depth of the well has also been specifically designated. Furthermore, the portion of the well below the marine bottom 16 has been foreshortened for illustrative purposes. The example supplied is of a 13,500-foot well in 120 feet of water having the conductor pile 20, of 30" diameter, set 200 feet into the unconsolidated subaqueous formations underlying the marine bottom 16. A 16" casing string 48, usually designated as the surface casing string, extends to 650 feet and is cemented into the formations and the conductor pile 20. The borehole of the well is further extended by a 10¾" casing string 50 extending to 3,000 feet, a 7⅝" casing string 52 extending to 10,550 feet, and a 5½" liner 54 extending from about the 10,500-foot point to 13,000 feet, leaving the last 500 feet as open hole. The lower end of the 5½" liner is sealed off by a permanent packer or retainer 56 cemented in place. Cement plugs 58 are set at spaced intervals in the 7⅝" casing string 52 in accordance with Coast Guard regulations and conventional practice.

With the well drilled and all of the well casing strings hung and sealed off, the BOP stack 28 is removed along with the marine riser 34 and a corrosion cap 60 is installed on the top of the underwater wellhead 26 prior to the drilling ship 10 having moved off the site. The guidelines 22 may be cut off, if the water is shallow enough for a diver to work near the marine bottom 16, or they may be retained and stored near the bottom as in the illustrated embodiment, if it is not desirable to utilize divers in subsequent operations. The guidelines 22 are connected by an intermediate chain 62 to a midpoint along an anchor chain 64 connected between an anchor 66 on the marine bottom 16 and a submerged steel buoy or float 68. A surface marker buoy 70 is connected by a line 72 to the submerged buoy or float 68. Again this arrangement is conventional, particularly in the Gulf of Mexico where, for example, the submerged buoy 68 is anchored fifty feet or so beneath the surface 12 to insure that the underwater wellhead 26 can be reloated if the surface buoy 70 is lost during a storm, the surface buoy 70 containing the appropriate well information stenciled thereon.

Figure 3:
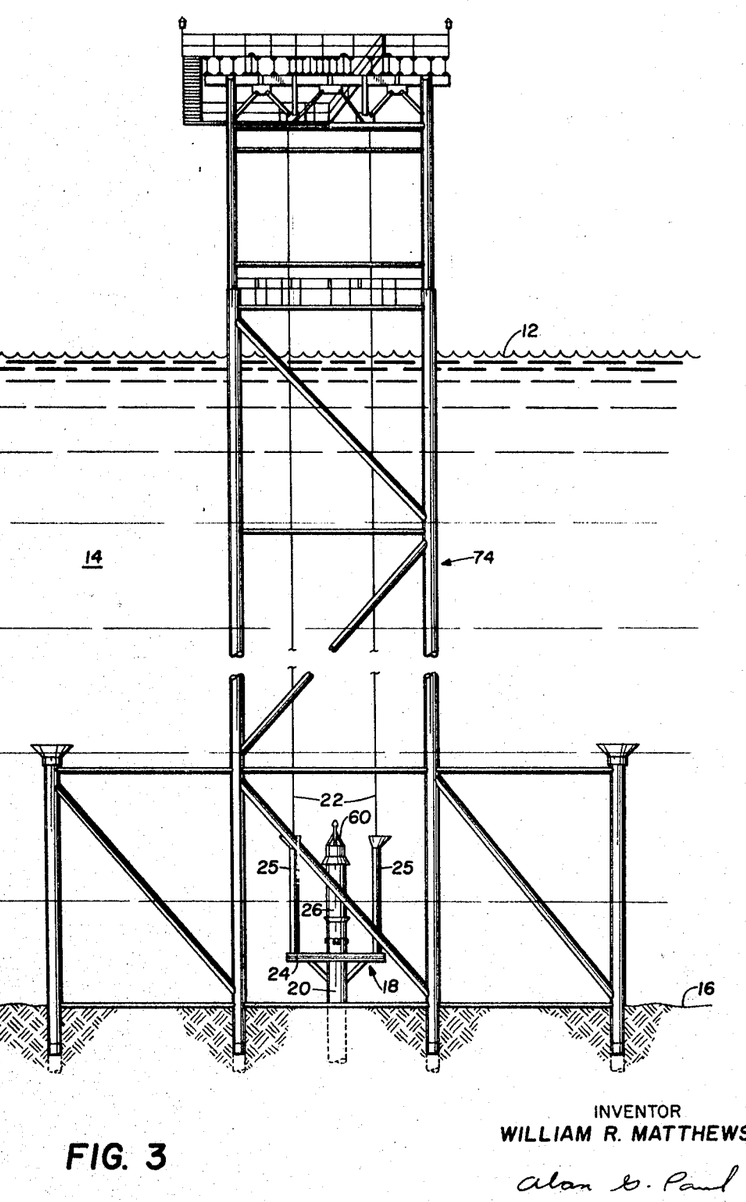
FIGURE 3 is a side elevational view of that portion of the subaqueous well of FIGURE 2 that extends above the marine bottom with a production platform set thereover, prior to completing the well on the platform.
Figure 4:
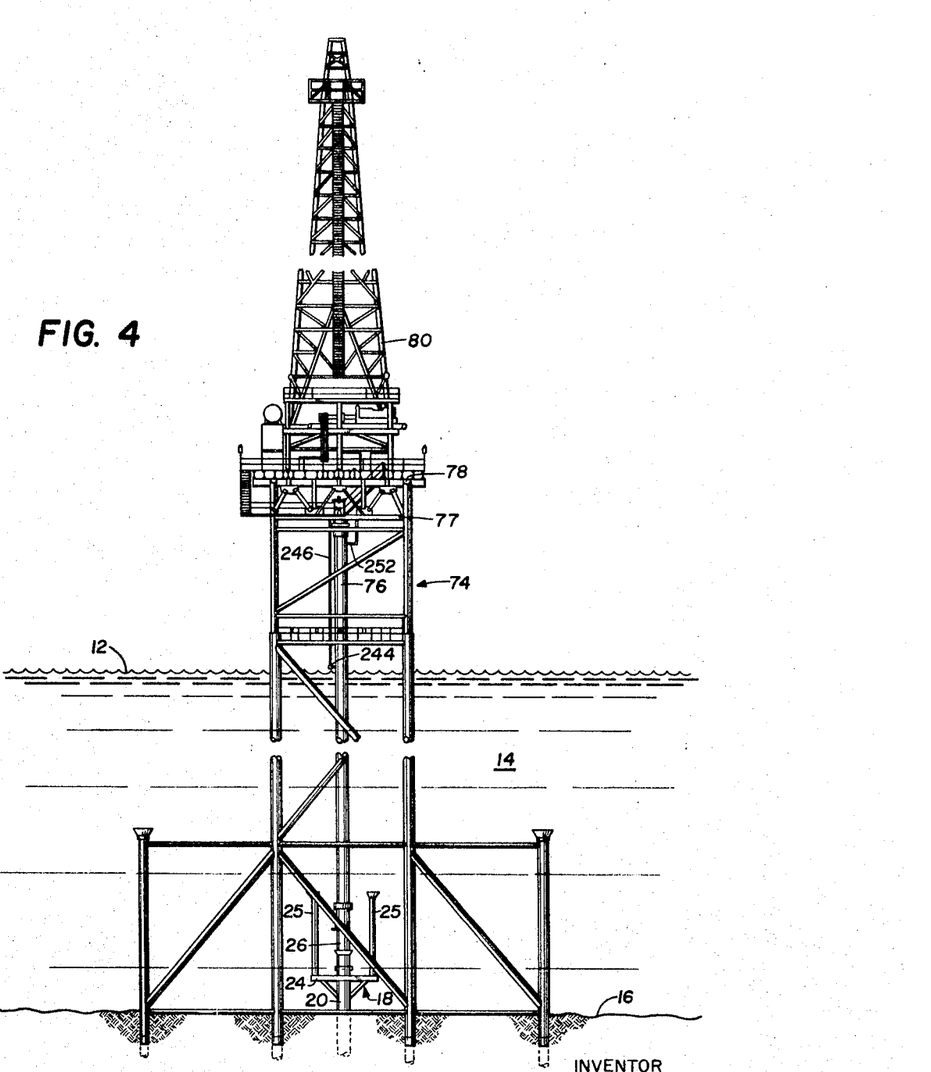
FIGURE 4 is a side elevational view of the production platform of FIGURE 3 with a drilling rig set on the upper deck thereof, the well having been extended from the marine bottom to the production deck of the production platform.

FIGURE 3 shows the capped well with a produtcion platform, generally designated 74, mounted thereover and anchored into the marine bottom 16. The production platform 74 may be located over the subaqueous well by a derrick barge (not shown) on the surface with the help of the guidelines 22 brough back to the surface, or by a diver situated on the bottom 16 and relaying instructions. In FIGURE 4 the well is shown as having been tied back to a point above the surface, after the removal of the corrosion cap 60 (FIGURE 3), by a marine production riser 76 extending to the production deck 77 of the platform 74. The upper deck 78 supports a drilling rig 80 thereon for drilling out the cement plugs 58, and for removing packing elements, and handling the well casing strings and casing risers, as will be described later.

Figure 5:
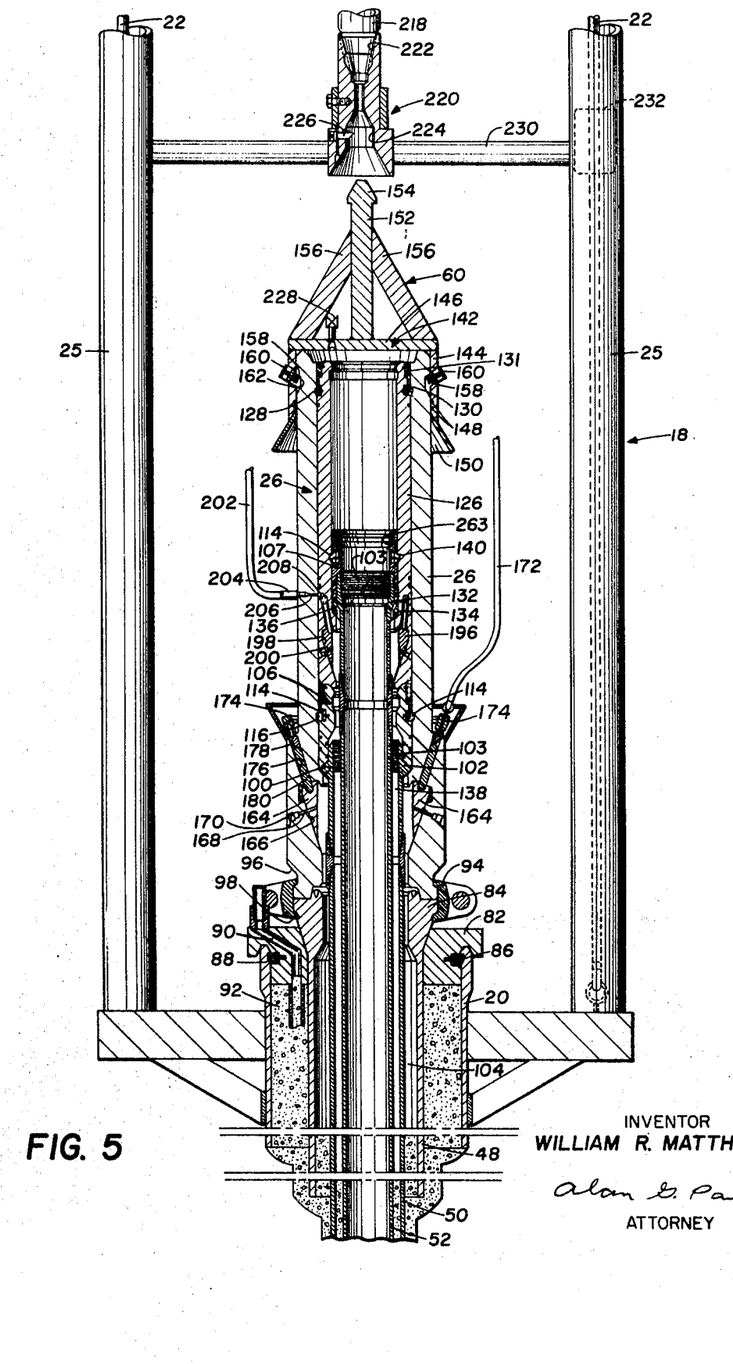
FIGURE 5 is a sectional view of the subsea well illustrating, in particular, the structure of the capped underwater wellhead (FIGURE 3) including the means for suspending the various casing strings therewithin, just prior to having the corrosion cap removed by a corrosion cap handling tool mounted on the drill pipe string suspended and controlled from a drilling rig above the surface on the production platform.

FIGURE 5 shows, in partial section, the interior of the underwater wellhead 26 and a portion of the subaqueous well as they would appear prior to the corrosion cap 60 being removed. As can be seen clearly in this view, each of the casing strings 48–52 is cemented into the next larger well casing string or pile to form a unitary structure. More specifically, after the conductor pile 20 has been set in the formations underlying the marine bottom 16, and the borehole extended far enough for the setting of surface casing string 48, the 16″ surface casing string 48 is inserted through the conductor pile 20 and cemented in place. To locate the surface casing string 48 accurately with respect to the conductor pile 20, a locating head 82 is fixed (as by welding) on the upper end of the surface casing string 48 is conjunction with a mandrel head 84 which forms the uppermost joint of the surface casing string. The locating head 82 has outwardly biased detent latching means 86 for coacting with an internal circumferential groove 88 in the inner wall of the conductor pile 20 as the surface casing string 48 is lowered into the conductor pile 20. The locating head 82 also has a passageway 90 extending therethrough for conventional cementing operations or for cementing through the upper end of the annulus 92 between the conductor pile 20 and the surface casing string 48, as is more fully discussed in the U.S. Patent No. 3,386,505, issued to Ernst Leonhard, Jr. on June 4, 1968, and entitled "Supplementary Cementing Assembly for Subaqueous Wells." Once the surface casing string 48 has been cemented into the subaqueous formations beneath the marine bottom 16, and to the interior of the conductor pile 20, the underwater wellhead 26 is connected to the upper end of the mandrel head 84. This connection is effected by a conventional circular split clamp 94 which grips in adjacent grooves 96 and 98 in the lower end of the wellhead 26 and the upper end of the mandrel head 84, respectively. If the depth at which the wellhead 26 is to be connected to the mandrel head 84 of the surface casing string 48 is too deep for a diver to be used to bolt the clamp halves together, one of the remotely controlled connectors, well known in the art, may be used.

A beveled circumferential surface 100, serving as a transition between the upper larger diameter section of the passage through the wellhead 26 and the lower smaller diameter thereof, acts as a seat for the mandrel head 102 of the 10¾″ casing string 50 which is set in the wellhead 26 by a running string (not shown) suspended from the drilling rig 80. The upper end of the mandrel head 102 is internally threaded with a left-hand thread 103 to mate with a left-hand thread adapter (not shown) on the end of the running string. Since this is the only left-hand thread connection in the casing string, it can be broken by rotating the running string, without the danger of any other threaded joint separating. To prevent the entire casing string 50 from rotating, the lower face of the mandrel head 102, resting on the beveled surface 100, is serrated. An annulus 104 formed between the surface casing string 48 and the casing string 50 is positively sealed by a releasable packing unit 106.

Figures 6A, 6B:
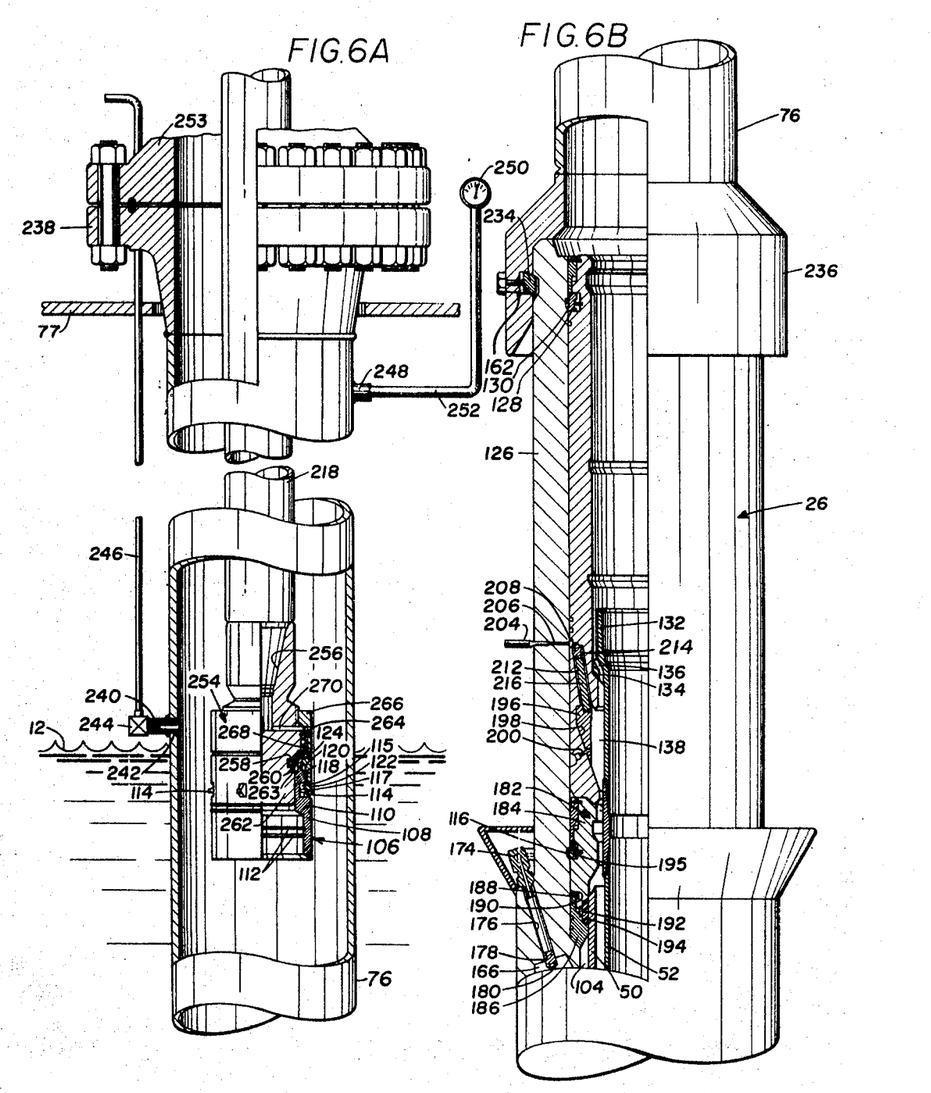
FIGURES 6A and 6B are respectively the top and bottom parts of a side elevational enlarged view, partially in cross section, showing the subaqueous well of FIGURE 5 extended from the underwater wellhead, to a point above the surface, by a marine conductor pipe; and a drill pipe handling string in the process of removing a pressure packing from an annulus between two of the casing strings previously hung in the underwater wellhead, prior to extending the casing strings upward from the underwater wellhead.

The packing unit 106 is shown enlarged in FIGURE 6A as being removed by a packing unit retrieval tool 254. The packing unit 106 consists of a substantially tubular body section 108 having O-rings 110 seated in circumferential grooves in the outer wall thereof to seal the packing unit 106 to the inner wall of the wellhead 26. O-rings 112 seated in circumferential grooves in the inner wall of the body section 108 seal the packing unit 106 to the mandrel head 102 of the casing string 50. The packing unit 106 is held down in the annular space by a spring latch means consisting of a plurality of outwardly biased detent fingers 114, set in pockets 115 ringing the outer wall of the body section 108, and locking into a circumferential groove 116 (FIGURE 5) in the inner wall of the wellhead 26. A compression spring 117 is located in each pocket 115 behind the detent finger 114 to provide the outward bias. The individual detent fingers 114 are retained in their pockets in the body section 108 of the packing unit 106 by a depending circumferential flange 118, of a slidable collar 120 mounted on the upper end of the body section 108, which coacts with cam surfaces 122 on all of the detent fingers 114 simultaneously. The collar 120 is normally held in position by means of shear pins 124 driven through registering holes in the collar 120 and the body section 108 of the packing unit 106.

Referring to FIGURES 5, 6A and 6B, a slip spider 126 is lowered, by a handling string from the floating vessel 10, into the underwater wellhead 26 and rests on the upper end of the packing unit 106. The slip spider 126 is fixed in the well head 26 by a spring latch means consisting of a plurality of outwardly biased detent fingers 128, at the upper end thereof, which lock into a circumferential internal groove 130 formed in the upper end of the well head 26. A slidable collar 131 with a depending flange holds all of the fingers 128 in the slip spider 126, prior to the insertion of the slip spider 126 into the wellhead 26, while allowing the fingers 128 to extend outwardly into the internal groove 130 as the slip spider 126 is lowered into place. The arrangement of the elements of the latching means is identical to that of the packing unit 106. A mandrel head 132 of the 7⅝″ casing string 52 seats on a beveled circumferential ledge 134 in the lower end of the slip spider 126 and has fluid bypass passages 136 (one shown) drilled through the outer lip thereof for connecting an annulus 138, formed between the 10¾″ and 7⅝″ casing strings, 50 and 52, respectively, beneath the mandrel head 132, with the interior of the well head 26 above the mandrel head 132.

Prior to capping the wellhead 26, the releasable packing unit 106 is inserted into the annulus between the mandrel head 132 of the 7⅝″ casing string 52 and the slip spider 126 to seal off the annulus 138. The packing unit 106 is locked in position by the releasable detent fingers 114 extending into a circumferential groove 140 in the interior wall of the slip spider 126. With the setting of the packing unit 107 and the cement plugs 58 (FIGURE 2), the well is entirely sealed off and the corrosion cap 60 is placed over the top of the well head 26.

The corrosion cap 60 (see FIGURE 5) consists of a wellhead cover 142 made up of a tubular portion 144, adapted to slide over the upper end of the wellhead 26; and a cover plate 146, welded across the upper end of the tubular portion 144. O-rings 148 are fitted in circumferential grooves in the inner wall of the tubular portion 144 for forming a watertight seal between the cover 142 and the outer wall of the wellhead 26. A guide cone 150 is welded to the lower open end of the wellhead cover 142, while a braced vertical handling neck 152 is centrally welded on the upper face of the cover plate 146 and terminates in an enlarged frustoconical head 154. The handling neck 152 is supported by diagonal struts 156 extending between the outer edge of the cover plate 146 and the centrally located neck 152. The corrosion cap 60, set over the wellhead 26, is locked in place by a plurality of inwardly spring biased shear pins 158, each mounted in a cylindrical body 160 extending through the tubular portion 144 of the corrosion cap well head cover 142 and welded in place, and coacting with a circumferential groove 162 in the outer wall of the wellhead 26.

Described above is the ideal arrangement of the elements in the capped underwater wellhead. In actuality, the mandrel head 102 of the casing string 50 does not always abut the casing hanging surface 100 in the wellhead 126. If the casing string 50, lowered through the borehole, becomes stuck when it is deep enough to be functional but prior to the setting of the mandrel head thereof on the supporting surface in the well head 26, remedial action must be taken to hang the casing string within the wellhead 26. In FIGURES 5, 6B, and 7B such a means is shown as being utilized with respect to casing string 50. A set of slips 164 previously locked in formed cavities 166 in the inner wall at the lower end of the wellhead 26 is set to support the casing string 50 in the wellhead 26. Until actuated, the slips 164 are held in the cavities 166 by shear pins 168 extending through registering holes in the wall of the wellhead 26 and the body of each slip 164, A set screw 170 backs up each shear pin 168 in the wall of the wellhead 26. The slips 164 are hydraulically actuated through a flexible hose 172 connected between a source of hydraulic power (not shown) on the production platform 74 and a manifold 174 surrounding the wellhead 26. The manifold is connected to a plurality of cylindrical passages 176, each containing a slidable piston 178, and a piston rod 180 connecting the piston 178 to the slip 164 in the adjoining cavity 166. The application of fluid pressure through the hose 172 will fracture the shear pins 168 and drive all of the slips 164 down against the casing string 50 simultaneously.

With the abutting of the mandrel head 102 on the beveled surface 100, or alternatively the setting of the slips 164, the flexible hose 172 can be removed. If the slips 164 had to be set, the casing string 50 would now be cut off at approximately the height that the mandrel head 102 would have extended if the head 102 had seated down properly on the beveled surface 100. The annulus 104 is packed off by a packing unit 182 similar to the packing units 106 used in conjunction with the mandrel head 102 (FIGURE 5). Due to the lack of abutting metal surfaces between the casing string 50 and the wellhead 26, and the necessarily longer space to be filled, the tubular portion of the packing unit 182 is made up of a main body section 184 and a partially overlapping nose section 186. The nose section 186 is connected slidably over the body section 184 by a pin 188 driven through the nose section 186 and into a vertical groove 190 formed in the outer wall of the necked down lower end of the body section 184 over which the nose section 186 rides. An expandable packing element 192 is fitted into an inwardly facing composite groove 194 formed between the slidably connected body and nose sections 184 and 186, respectively. The packing unit 182, set by a downward force on the upper end thereof, is latched in the set position by spring detent means consisting of outwardly biased detent finger 195 locked in the circumferential groove 116, forces the nose section 186 to slide up relative to the body section 184, narrowing the composite packing groove 194 and expanding the included packing 192 inward against the casing string 50.

Referring to FIGURES 5, 6B, and 7B, a second set of slips 196 is shown stored in cavities 198 in the inner wall of the slip spider 126 and is held by shear pins 200 extending through the wall of the slip spider 126. This set of slips is also hydraulically actuatable from the platform 74 through a flexible hose 202. The hose 202 is connected at its lower end to an outwardly extending fitting 204 fixed in a radial passage 206 through the wall of the wellhead 26. The inner end of the passage 206 registers with a circumferential groove 208 in the outer wall of the slip spider 126, forming a manifold connected with cylindrical passages 212 within which are the pistons 214 connected by rods 216 to the slips 196 in the slip cavities 198. As shown in all the FIGURES 5, 6B, and 7B, the mandrel head 132 of the casing 52 has seated properly and the slips 196 have not been set.

With the well annuli sealed off at the underwater wellhead 26 by packing unit 106 (FIGURE 5), the central passage through the most interior casing string 52 sealed with cement plugs 58 (FIGURE 3), and the corrosion cap 60 locked in place over the upper open end of the wellhead 26, the work of the floating drilling vessel 10 (FIGURE 1) is completed and the vessel 10 is removed from the site. The interior of the underwater wellhead 26, with the corrosion cap 60 in place, remains substantially undisturbed by storms and undersea life, protecting the well for completion at a later date. When that date arrives and it is decided to complete the well from an above-surface deck of a bottom-supported platform, the platform 74 is set thereover (FIGURE 3) and the drilling rig 20 is placed on the platform deck 78.

Referring to FIGURE 5, a handling string 218 which extends from drilling rig 20 to the wellhead 26 is attached through a threaded joint 222 at the upper end of a corrosion cap handling tool 220. The tool 220 has a connected cavity 224 in its lower end shaped, at the upper terminus thereof, to match the frustoconical head 154 of the corrosion cap handling neck 152. One or more inwardly biased spring detent fingers 226, mounted in the body of the handling tool 220 and extending radially into the cavity 224 below is frustoconical upper terminus is adapted to be driven outwardly by the frustoconical head 154 of the handling neck 152 as the tool 220 is lowered over the handling neck, the spring detent finger 226 then dropping off into the area behind the head 154 to lock the handling tool 220 in place. A predetermined pull on the handling tool 220, from the drilling rig 80 on the production platform 74, will shear the pins 158 so that the corrosion cap 60 can be lifted from the upper end of the wellhead 26. If the cap 60 is stuck and cannot be removed with the predetermined vertical pull, a small explosive charge may be set off beneath the conical guide cone 150. A check valve 228, to which a pressure gauge can be connected, extends through the cover plate 146 of the corrosion cap 60 so that if a diver is utilized to help remove the cap 60 he can first check for any pressure having built up beneath the cap 60 in the wellhead 26, and can bleed off this pressure through the valve 228 prior to removal of the corrosion cap 60. The handling tool 220, as illustrated in FIGURE 5, is being guided down onto the handling neck 152 of the corrosion cap 60 on the end of the handling string 218 by the guideline system previously discussed. A yoke 230, attached at its midpoint to the handling tool 220, extends through longitudinal slots in the hollow guideposts 25, as shown in FIGURE 5. The yoke 230 has enlarged ends 232 (one shown in phantom) which slide within the guideposts 25, still riding down on the guidelines 22 which are anchored in the lower ends of the hollow guideposts 25 (see the aforementioned Geer patent).

Referring to FIGURES 4, 6A, and 6B, after the corrosion cap 60 has been successfully removed, the marine production riser 76 is lowered down through the platform 74 and is locked to the upper end of the wellhead 26 by inwardly biased latch means 234, mounted through the wall of the enlarged lower "stab-in" connector end 236 of the marine production riser 76 which has been telescoped over the upper end of the wellhead 26, locking in place in the circumferential groove 162 that previously functioned to hold the corrosion cap 60. If a diver has been used at all, his assistance in making up the marine production riser 76 to the wellhead 26 will complete the operations that require his services. After the marine production riser 76 is made up, it is cut off at about the production deck 77 and a bradenhead flange 238 is welded on. The marine production riser 76 is a self-supporting member and is only laterally supported by braces (not shown) between the riser pipe 76 and the production deck 77.

As the marine production riser 76 is made up and lowered to the wellhead 26 to form an enclosed guide between the underwater wellhead 26 and the production platform 74, a pipe fitting 240 is welded to the outside wall over a radial hole 242 drilled through the marine production riser or conductor pipe 76 at a point just above the water surface 12. A threaded bleed valve 244, screwed into the outer end of the pipe fitting 240, is adapted to be actuated from the production deck 77 by an extension handle 246 connected thereto. A second pipe fitting 248 is installed on the marine production riser 76 just below the production deck 77. A pressure gauge 250, above the deck 77, is connected to the fitting 248 by a length of pipe 252 to serve as an indication of pressure in the low pressure marine production riser 76 for personnel on the platform 74.

A large BOP 253 (only partially shown), bolted on the bradenhead flange 238 before any of the packoffs in the well are removed, is nippled up and pressure tested. The next step is to remove the packing unit 106 to obtain access to the annulus 138 between the 10¾" casing string 50 and the 7⅝" casing string 52. The marine production riser 76, locked in place over the wellhead 26, acts as the guide between the underwater wellhead 26 and the production deck 77 of the production platform 74 for the handling string 218 again lowered, this time through the BOP 253, and with the packing unit retrieving tool 254 fixed to the lower end thereof. As shown in FIGURE 6A the packing unit 106 is already unlatched from the slip spider 126 (FIGURE 5), being withdrawn by the retrieval tool 254. A threaded cavity 256 in the upper end of the tool 254 provides a means of connecting the tool 254 to the threaded lower end of the handling string 218, as well as forming a fluid passage connected with the interior of the hollow pipe of the handling string 218. The packing unit 106 has been removed from the space between the mandrel head 132 and the slip spider 126 by inserting the retrieval tool 254 thereinto with outwardly biased latch fingers 258, mounted in pockets 260 in the cylindrical body 262 of the tool 254 coacting with an internal circumferential groove 263 in the inner wall of the packing unit 106 for transmitting an upward pull from the tool 254. The retrieval tool 254 has a circumferential piston 264 slidable within a chamber formed between the cylindrical body 262 of the retrieval tool 254 and a threaded-on cylindrical cover element 266. A depending flange 268 of the piston 264 extends through an annulus between the cover element 266 and the body 262 of the retrieval tool 254 so that when the retrieval tool 254 is latched to the packing unit 106 and the handling string 218 is pressured up (by a pressure source on the platform 74). Fluid pressure is applied to the rear of the piston 264 through intermediate passages 270 connecting the central cavity 256 with the chamber behind the piston 264. This will cause the piston 264 to move downward driving the depending flange 268 thereof into contact with the slidable collar 120 on the upper end of the packing unit 106. The continued application of hydraulic pressure behind the circumferential piston 264 will break the shear pins 124 holding the collar 120 in place and will cause the flange 118 thereof to be driven downward against the cam faces 122 of the detent fingers 114, driving the fingers 114 inward and releasing the packing unit 106 from the slip spider 126. Once the fingers 114 are unlatched, the handling string 218 is drawn up through the BOP 253 on the marine production riser 76 with the retrieval tool 254 and the attached packing unit 106. The removal of the packing unit 106 provides fluid communication between the annulus 138 and the interior of the upper end of the wellhead 26 above the mandrel head 132 of the 7⅝" casing string 52 by the passage 136 drilled through the mandrel hanger 132.

Figure 7A:
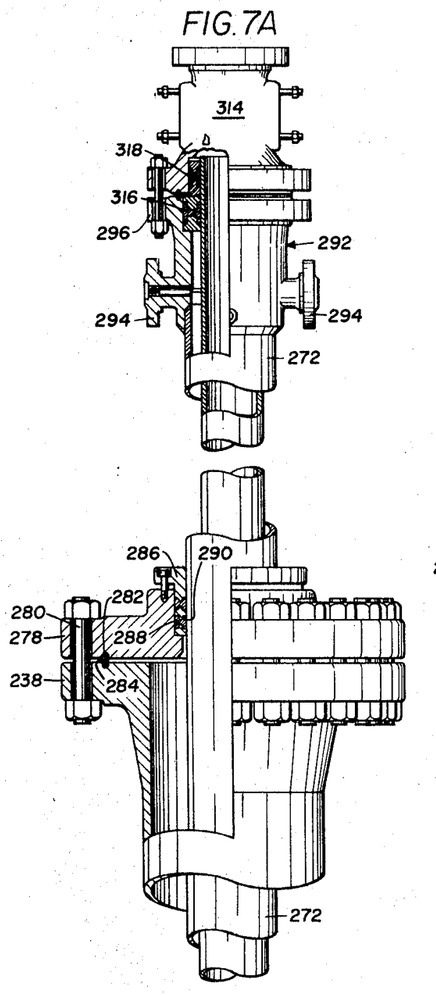
FIGURES 7A and 7B are respectively the top and bottom parts of a side elevational enlarged view, partially in cross section of the assembled apparatus for extending the well from the underwater wellhead to the production platform, with the exception of the production tubing and Christmas tree which are conventional and so have been omitted for purposes of clarity.
Figure 7B:
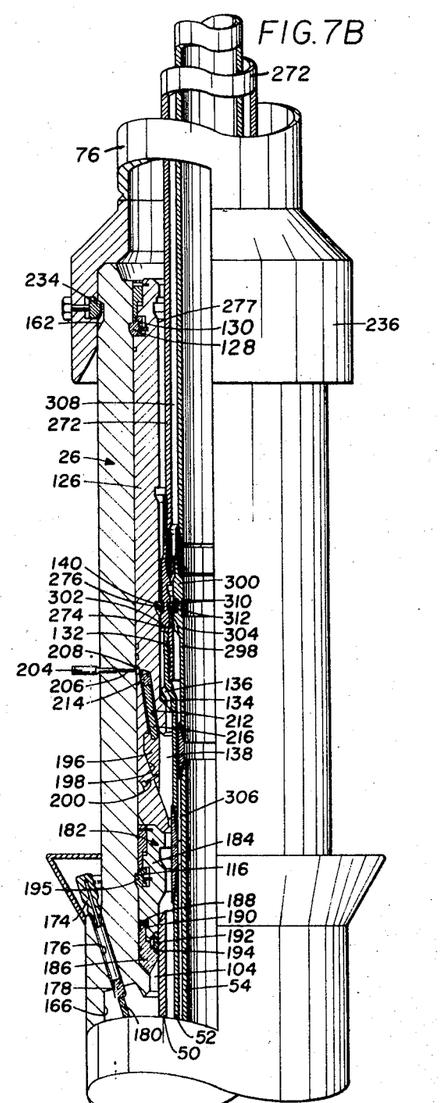

Referring to FIGURES 7A and 7B, the casing string 50 being permanently packed off, the casing string 52 can now be tied back to a point above the marine production riser 76. Rather than extend it back as a 7⅝" casing string, the extension consists of an 8⅝" casing riser 272 allowing more space within the underwater wellhead 26 for later hanging a 5½" production casing string. Connected between the lower end of the 8⅝" casing riser 272 and the 7⅝" casing string 52 is casing hanger support section 274 provided with outwardly biased latch means 276 for locking into the circumferential groove 140 in the inner wall of the 7⅝" slip spider 126, which previously received the detent fingers 114 (FIGURE 6A) of the packing unit 106. The lower end of the casing hanger support section 274 is necked down and externally threaded to screw within the upper end of the mandrel head 132 to effect a metal-to-metal seal therewith. The 8⅝" casing riser 272 can be installed through the BOP 253 (FIGURE 6A), handled by a pipe string suspended from the drilling rig 80 (FIGURE 4), but in all probability the BOP 253 would be removed prior to making up the 8⅝" casing riser 272 since it is difficult to strip such a large unit over the made-up 8⅝" casing riser 272 extending above the marine production riser 76. In any case the BOP 253 is removed by the time the casing riser 272 is made up and the annulus 277 formed between the casing riser 272 and the marine production riser 76 is packed off by an upper bradenhead flange 278 fixed to the lower bradenhead flange 238 by a plurality of bolts 280 ringing the flanges, the upper bradenhead flange 278 having a packing ring 282 included in a composite groove 284 between the flanges to obtain a high pressure seal therebetween. A packing gland 286 is bolted into an upper countersunk portion 288 of a central passage through the upper bradenhead flange 278 with packing material 290 compressed in the countersunk portion 288 beneath, to form a pressure-tight slidable seal between the marine production riser 76 and the upper end of the casing riser 272 extending therethrough.

A bradenhead spool 292, having a pair of opposed flanged outlets 294, is screwed onto the top of the 8⅝" casing riser 272. A 6" BOP stack (not shown) is bolted to an upper flanged end 296 of the bradenhead spool 292 and a retrievable packer (not shown) is set in the 7⅝" casing string 52 near the upper end. Supposing a successful pressure test of the 6" BOP stack and the connections used to tie back the 7⅝" casing string 52, the retrievable packer is removed and drill pipe is made up through the 6" BOP stack to drill out the cement plugs 58 set in the casing string 52, prior to capping the well.

If it is desirable to drill the well further, this is done before setting any production casing. For purposes of this discussion, no more drilling is to be done and production casing string is set at this point by tying back into the 5½" liner 54 with a 5½" production casing string 298 made up and lowered into the hole through the 6" BOP stack by the drilling rig 80 (FIGURE 4). A necked down lower end of the made up production casing string 298 (not shown) has O-rings mounted therearound so that as it slides into the upper end of the cemented-in liner 54 it seals the joint. A casing hanger section 300 made up in the upper portion of the production casing string 298 seats on a internal shoulder 302 on the casing hanger support section 274. The casing hanger section 300 has fluid bypass passages 304 drilled through the outer lip thereof for connecting the annulus 306, between the 7⅝" casing string 52 and the production casing string 298 below the casing hanger support section 274, with the annulus 308 between the 8⅝" casing riser 272 and the production casing string 298 above the casing hanger support section 274. Outwardly biased detent fingers 310 in the outer wall of the casing hanger section 300 coact with a circumferential groove 312 in the inner wall of the casing hanger support section 274 to lock the casing string 298 in place.

With the 5½" casing string 298 hung in the wellhead 26 and extended above the bradenhead spool 292, the well is weighted with mud, the cement plug is drilled out, and then the 6" BOP stack is removed. A tubinghead spool 314 is bolted on the top of the bradenhead 292 with compressible packings 316 and 318 set in the counterbored opposing faces of the upper end of the bradenhead 292 and the lower end of the tubinghead spool 314, respectively. When the tubinghead spool 314 is bolted down tightly to the bradenhead 292 the annulus 308 between the 5½" production casing string 298 and the 8⅝" casing riser 272 is sealed off. A packing is used rather than a threaded connection between the tubinghead spool 314 and the production casing string 298 as well as at the packoff for the annulus 277 between the 20" marine production riser 76 and the 8⅝" casing riser 272 to allow for a limited amount of differential movement or "breathing" between the marine production riser 76 and the 8⅝" casing riser 272, and between the casing riser 272 and the production casing string 298 to prevent an undue strain due to the possible shifting of the various components under wind and tidal loads.

A conventional Christmas tree (not shown) is mounted atop the tubinghead spool 314 and the production tubing (not shown) is hung either within the Christmas tree or supported in the wellhead 26 by a casing hanger section made up thereinto and seating on a flange on the inside of the casing hanger section 300. If the production tubing is supported in the wellhead 26 it would be packed off in the Christmas tree to allow limited movement. With these arrangements the marine production riser 76 theoretically supports only its own weight. The bradenhead spool 292, the tubinghead spool 314, The Christmas tree, and the production tubing are all supported by the 8⅝" casing riser 272 which is in turn supported at the mudline by the wellhead 26. The production tubing is also supported at the mudline directly by the wellhead 26 or through the 8⅝" casing riser 272.

Although the present invention has been described in connection with details of the specific embodiments thereof, it is to be understood that such details are not intended to limit the scope of the invention. The terms and expressions employed are used in a descriptive and not a limiting sense and there is no intention of excluding such equivalents, in the invention described, as fall within the scope of the claims. Now having described the apparatus herein disclosed, reference should be had to the claims which follow.

What is claimed is:

1. A mudline suspension system for completing a subaqueous well on the production deck of a bottom-supported production platform, said production deck being far enough above the surface of a body of water in which said platform is located so as not to be in contact with surface waves, comprising: an underwater wellhead supported at the mudline in said body of water; a marine production riser forming an enclosed guide between said underwater wellhead and said production deck; a well casing string supported in said underwater wellhead; means for extending said well casing string through said marine production riser and thereabove; means for sealing an annulus formed between said marine production riser and the well casing string extension of said well casing string, at the upper end of said marine production riser; means at said production deck for indicating pressure in said annulus between said marine production riser and said well casing string; and means near said water surface for controllably relieving pressure in said marine production riser.

2. The mudline suspension system of claim 1 wherein there is means for remotely actuating said pressure relieving means from above said production deck.

3. A mudline suspension system for completing a subaqueous well on the production deck of a bottom-supported production platform, said production deck being far enough above the surface of a body of water in which said platform is located so as not to be in contact with surface waves comprising: an underwater wellhead supported at the mudline in said body of water, a marine production riser forming an enclosed guide between said underwater wellhead and said production deck; means for laterally supporting said marine production riser from said production platform while permitting relative vertical movement, a first well casing string supported at the mudline in said underwater wellhead and extending through and above said marine production riser; and means for slidably sealing a first annulus formed between said first well casing string and said marine production riser at said production deck whereby limited vertical motion is permitted between said marine production riser and said first well casing string.

4. A mudline suspension system as recited in claim 3 wherein said first annulus sealing means includes a bradenhead flange rigidly fixed to the upper end of said marine production riser; and compressed packing means between said bradenhead flange and said first well casing string for slidably sealing said first annulus.

5. A mudline suspension system as recited in claim 3 wherein there is a second well casing string supported at the mudline in said underwater wellhead and extending through and above said first well casing string; and means for slidably sealing a second annulus between said first and second casing strings above said production deck whereby limited vertical motion is permitted between said first and second well casing strings.

6. A mudline suspension system as recited in claim 5 wherein said second annulus sealing means between said first and second well casing strings includes a bradenhead spool rigidly fixed on the upper end of said first well casing string; compressed packing means between the upper end of said bradenhead spool and said second well casing string; and port means through said bradenhead spool to provide an operative connection with said second annulus.

7. A mudline suspension system as recited in claim 5 wherein a production well casing string is supported at the mudline in said underwater wellhead and extends through and above said second casing string; and a means for slidably sealing a third annulus formed between said production well casing string and said second well casing string at the upper end of second well casing string above said first well casing string whereby limited vertical motion is permitted between said second well casing string and said production well casing string.

8. A mudline suspension system as recited in claim 7 wherein said third annulus sealing means between said second and production well casing strings includes a tubinghead spool rigidly fixed to said second well casing string; compressed packing means between the upper end of said tubinghead spool and said production well casing string above said first well casing string; and port means through said tubinghead spool to provide an operative connection with said third annulus.

9. A mudline suspension system as recited in claim 8 wherein a production wellhead is mounted above said tubinghead spool, a production well tubing string extending through said production well casing string from said production wellhead to a subaqueous producing formation.

10. A mudline suspension system as recited in claim 9 wherein said production well tubing string is supported at the mudline in said underwater wellhead; and means for slidably sealing said production tubing string in the lower end of said production wellhead.

References Cited
UNITED STATES PATENTS

| | | | |
|---|---|---|---|
| 2,077,044 | 4/1937 | Grace et al. | 166—.5 |
| 2,159,401 | 5/1939 | Rector | 166—88 |
| 2,194,265 | 3/1940 | Abercrombie | 166—88 X |
| 2,607,422 | 8/1952 | Parks et al. | 166—.5 |
| 3,089,543 | 5/1963 | Raulins | 166—75 |
| 3,256,937 | 6/1966 | Haeber et al. | 166—.6 |
| 3,310,107 | 3/1967 | Yancey | 166—.6 |
| 3,353,364 | 11/1967 | Blanding et al. | 166—.5 |

CHARLES E. O'CONNELL, Primary Examiner

R. E. FAVREAU, Assistant Examiner

U.S. Cl. X.R.

175—7